United States Patent
Chang

(10) Patent No.: US 8,570,367 B2
(45) Date of Patent: Oct. 29, 2013

(54) 3-DIMENSIONAL DISPLAY DEVICE WITH SLIDABLE LENTICULAR LENS

(75) Inventor: Jen-Tsorng Chang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 634 days.

(21) Appl. No.: 12/823,134

(22) Filed: Jun. 25, 2010

(65) Prior Publication Data
US 2011/0157337 A1    Jun. 30, 2011

(30) Foreign Application Priority Data
Dec. 30, 2009 (CN) .......................... 2009 1 0312793

(51) Int. Cl.
*H04N 15/00* (2006.01)
*H04N 13/04* (2006.01)
*H04N 9/47* (2006.01)

(52) U.S. Cl.
USPC .......................................................... 348/59

(58) Field of Classification Search
None
See application file for complete search history.

(56) References Cited

U.S. PATENT DOCUMENTS

| 5,500,765 | A | 3/1996 | Eichenlaub |
| 2005/0073515 | A1* | 4/2005 | Kee et al. ...................... 345/204 |
| 2007/0086089 | A1* | 4/2007 | Hunt ............................ 359/455 |
| 2008/0204548 | A1* | 8/2008 | Goulanian et al. ............ 348/51 |
| 2010/0061048 | A1* | 3/2010 | Mills ........................ 361/679.21 |
| 2010/0279739 | A1* | 11/2010 | Lin et al. ..................... 455/566 |

* cited by examiner

*Primary Examiner* — Joseph Ustaris
*Assistant Examiner* — Kevin McInnish
(74) *Attorney, Agent, or Firm* — Altis & Wispro Law Group, Inc.

(57) ABSTRACT

An electronic apparatus includes a main body, a 2-dimensional display panel and a display-mode switching device. The main body includes a first surface. The 2-dimensional display panel is mounted in the first surface for selectively displaying 2-dimensional images, and left and right parallax images. The display-mode switching device includes a lenticular lens sheet capable of directing the left parallax image light beams to a left eye of the viewer and directing the right parallax image light beams to a right eye of the viewer. The display-mode switching device is movably mounted on the main body between a first position where the lenticular lens sheet is overlaid on the 2-dimensional display panel to convert the left and right parallax images into stereoscopic images and a second position where the lenticular lens sheet is moved away from the 2-dimensional display panel such that the 2-dimensional display panel displays the 2-dimensional images.

20 Claims, 4 Drawing Sheets

3-DIMENSIONAL DISPLAY DEVICE WITH SLIDABLE LENTICULAR LENS

BACKGROUND

1. Technical Field

The present disclosure relates to a display device and, especially, relates to an electronic apparatus capable of selectively displaying 2-dimensional (2D) and 3-dimensional (3D) images.

2. Description of Related Art

Electronic apparatuses, such as mobile phones, MP4s and personal digital assistants, are widely in use in our everyday life. As the development of 3D display technology progresses, electronic apparatuses capable of displaying 3D images and 3D videos are becoming in greater demand.

Typically, a 3D display device is a display device capable of conveying 3D images to the viewer. The 3D display device can be selected from a stereoscopic display, an auto-stereoscopic display, and volumetric displays. In practical use, most users may desire display devices of their electronic apparatuses to be capable of displaying both 2D images/video and 3D images/video. However, 3D display devices typically include multiple lenses or parallax barriers on the outermost surface which cause 2D images to appear blurry. This is not desirable for the users of the electronic apparatuses.

Therefore, a display device that can overcome the above-mentioned problems is desired.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Various embodiments will now be described in detail below with reference to the drawings.

Figure 1:
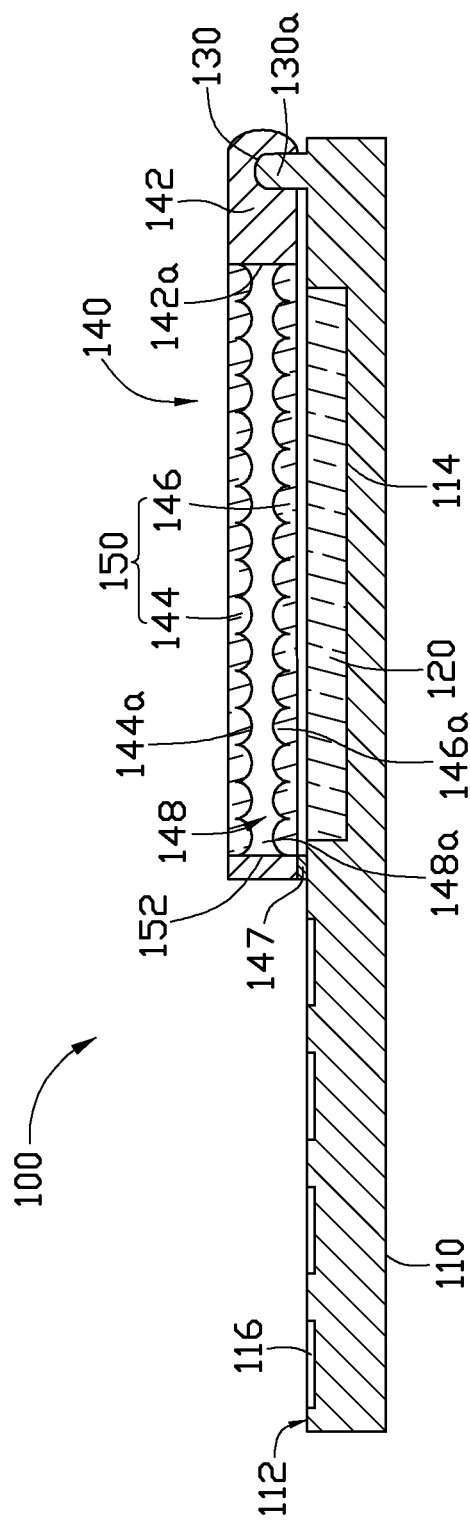
FIG. 1 is a schematic, sectional view of an electronic apparatus in accordance with a first exemplary embodiment, the electronic apparatus including a display-mode switching device in a first position.

Referring to FIG. 1, an electronic apparatus 100 in accordance with a first exemplary embodiment is provided. The electronic device 100 can be a mobile phone, an MP4 or a personal digital assistant, a laptop computer, or a desktop computer. The electronic apparatus 100 includes a main body 110, a 2D display panel 120, and a display-mode switching device 140 to enable 3D images to be displayed.

The main body 110 includes electronic elements and an integrated circuit (not shown) therein for providing various functions to the electronic apparatus 100. The main body 110 has a surface 112, and defines a receiving recess 114 with a rectangular cross-section. The electronic apparatus 100 further includes a keypad 116 mounted in/on the surface 112 adjacent to the side of the receiving recess 114. The keypad 116 is used for inputting data, such as characters and numerals, which can be displayed on the 2D display panel 120.

The 2D display panel 120 is received in the receiving recess 114, and electrically connected to the main body 110. The 2D display panel 120 has a thickness substantially equal to a depth of the receiving recess 114 such that a surface of the 2D display panel 120 is substantially coplanar with the surface 112. The 2D display panel 120 is configured for displaying 2D images.

The display-mode switching device 140 includes a connecting portion 142 and a display-mode switching portion 150. The connecting portion 142 defines a through hole 152 having a rectangular cross-section. The cross-section of the through hole 152 has the same or larger area as the opening of the receiving recess 114. The display-mode switching portion 150 is received in the through hole 152, and fixed to the connecting portion 142.

The display-mode switching device 140 is pivotably coupled to the main body 110 with a pivot part 130. The pivot part 130 includes two pivot posts 130a. At the viewing angle of FIG. 1, only one pivot post 130a is shown. The two pivot posts 130a are fixed to the main body 110 adjacent to a side of the receiving recess 114 and away from the keypad 116. One end of connecting portion 142 of the display-mode switching device 140 is positioned between and pivotably connected to the two pivot posts 130a of the pivot part 130 in a manner such as shaft-bore fitting.

The display-mode switching portion 150 includes a first lenticular sheet 144 and a second lenticular sheet 146 facing toward each other. The first lenticular sheet 144 and the second lenticular sheet 146 are spaced apart by a small distance. The first lenticular sheet 144 includes a plurality of first cylindrical lenses 144a parallel with each other and closely arranged. The second lenticular sheet 146 includes a plurality of second cylindrical lenses 146a parallel with each other and closely arranged. The first lenticular sheet 144 is aligned with the second lenticular sheet 146, in such a way that each of the first cylindrical lenses 144a is aligned one corresponding second cylindrical lens 146a. Therefore, a space 148a is formed between each first cylindrical lens 144a and the corresponding second cylindrical lenses 146a. The number of the cylindrical lens 148a in the lenticular sheet 148 is predetermined using algorithms known in the art. The display-mode switching device 140 further includes a support pad 147. The support pad 147 is fixed to a surface of the connecting portion 142 adjacent to the end of the connection portion 142 and away from the pivot part 130. The support pad 147 is configured for spacing the end of the connecting portion 142 and the main body 110 in such a way that the first and second lenticular sheets 144 and 146 are positioned an equal distance to the surface of the 2D display panel 120 and the connecting portion 142 has an equal distance from the surface 112 along a line between the support pad 147 and the pivot part 130.

When the display-mode switching device 140 is pivotably rotated to a first position as shown in FIG. 1, the second lenticular sheet 146 faces toward the 2D display panel 120. In such a case, the 2D display panel 120 displays images comprising left and right parallax images. The light of images shown on the 2D display panel 120 transmits through the third lenticular sheet 148, whereby the left and right parallax images are observed upon being separated for viewing by the eyes of the user. Thus, 3D images are seen by the user of the electronic apparatus 100.

Figure 2:
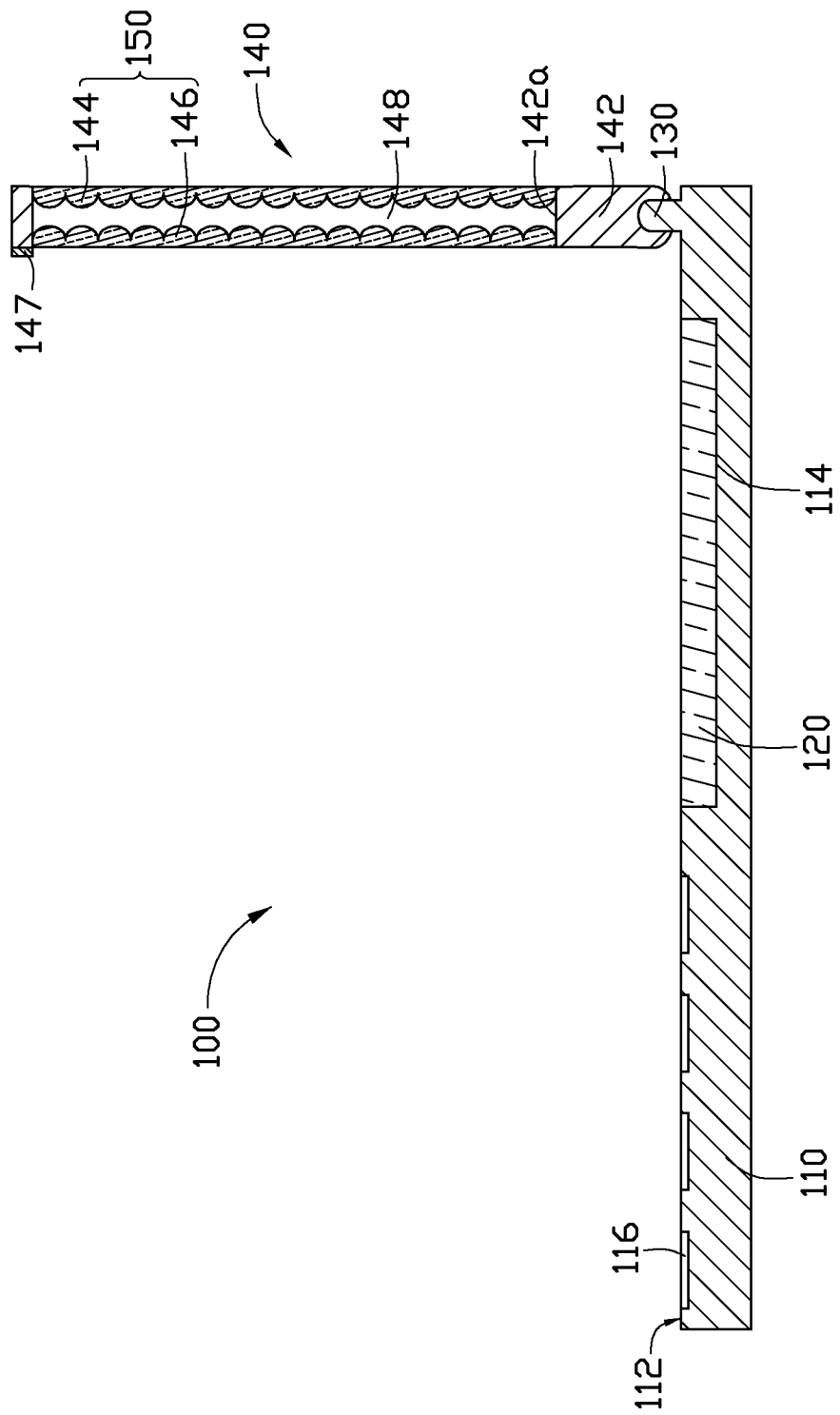
FIG. 2 is a schematic, sectional view of the electronic apparatus of FIG. 1, the display-mode switching device being in a second position.

Referring to FIG. 2, when the display-mode switching device 140 is pivotably rotated to a second position. In such case, the 2D display panel 120 displays 2D images. The first and second lenticular sheets 144 and 146 are rotated to a position away from the 2D display panel 120. Thus, the 2D display panel 120 is exposed, thereby in a viewing field of the user of the electronic apparatus 100, without interference of the display-mode switching portion 150. Thus, 2D images shown on the 2D display panel 120 can be clearly seen.

The display-mode switching portion 150 can also be a single lenticular sheet, a parallax barrier, or other optical sheet known in the art capable of separating the parallax images corresponding to the left or right eyes of the viewer.

Figure 3:
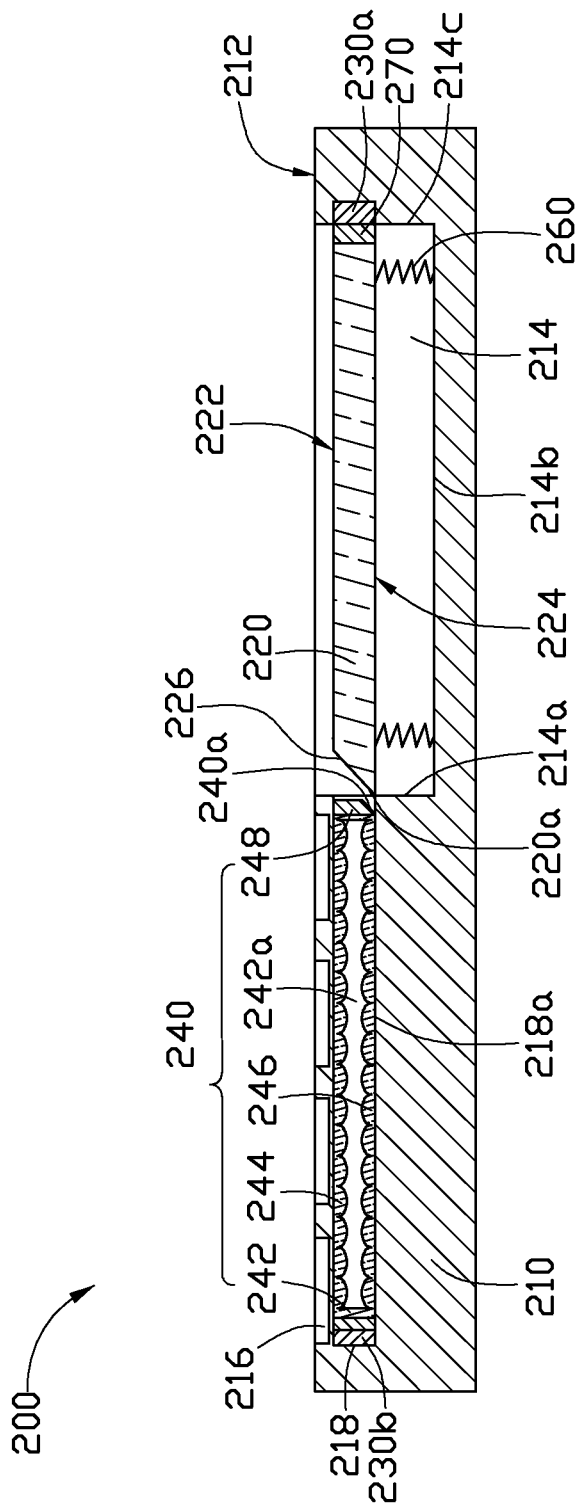
FIG. 3 is a schematic, sectional view of an electronic apparatus in accordance with a second exemplary embodiment, the electronic apparatus including a display-mode switching device in a first position.

Referring to FIG. 3, an electronic apparatus 200 in accordance with a second exemplary embodiment includes a main body 210, a 2D display panel 220, and a display-mode switching device 240.

The main body 210 includes a surface 212 and a receiving recess 214 within the surface 212. The electronic apparatus 200 further includes a keypad 216 adjacent to the side of the receiving recess 214. The keypad 216 is used for inputting data, such as characters and numerals, which can be displayed on the 2D display panel 220. The main body 210 is partially defined by a first side face 214a, a bottom face 214b, and a second side face 214c in the receiving recess 214. The first side face 214a and the second side face 214c are opposite to each other, and are adjacent to the surface 212 of the main body 210. The first side face 214a is also adjacent to the keypad 216. A receiving cavity 218 is defined in the first side face 214a, and extends away from the receiving recess 214. In this embodiment, the receiving cavity 218 is arranged beneath the keypad 216. A first electromagnet 230a is embedded in the second side face 214b, and faces toward an opening of the receiving cavity 218.

The display panel 220 is received in the receiving recess 214. A first permanent magnet 270 is fixed to one side face of the display panel 220 adjacent to the first electromagnet 230a. The display panel 220 has a first surface 222 parallel to and adjacent to the surface 212 of the main body 210, and a second surface 224 facing away from the first surface 222. A side of the display panel 220 opposite to the first permanent magnet 270 defines a slanted surface 226 adjacent to the first surface 222. The slanted surface 226 extends toward the opening receiving cavity 218 from an edge of the first surface 222. A number of spring elements 260 are arranged between the second surface 224 and the bottom face 214b. Two opposite ends of each of the spring elements 260 are fixed on the second surface 224 and the bottom surface 214b, respectively. In this embodiment, the two spring elements 260 are configured to space the display panel 220 apart from the bottom surface 214b.

The display-mode switching device 240 includes a connecting portion 242, a first lenticular sheet 244, a second lenticular sheet 246, and two second permanent magnets 248. Similar to the display-mode switching device 140 of the first exemplary embodiment, the first and second lenticular sheets 244 and 246 are fixed to the connecting portion 242, are parallel to each other, and are spaced from each other. The space between the first and second lenticular sheets 244 and 246 forms a third lenticular sheet 242a. The third lenticular sheet 242a is identical to the third lenticular sheet 148 of the first exemplary embodiment. The two permanent magnets 248 are fixed on two opposite side faces of the connecting portion 242.

The receiving cavity 218 has a similar size to the display-mode switching device 240. The main body 210 defines a bottom surface 218a in the receiving cavity 218 parallel to and adjacent to the bottom surface 214b of the receiving recess 214. A distance between the bottom surfaces 214b and 218a is larger than a thickness of the 2D display panel 220. A second electromagnet 230b is arranged in the receiving cavity 218 close to the side of the receiving cavity 218 away from the receiving recess 214.

The display-mode switching device 240 is slidably received in the receiving cavity 218. One of the two second permanent magnets 248 is arranged facing toward the second electromagnet 230b. The second permanent magnet 248 away from the second electromagnet 230b has a slanted surface 240a. The slanted surface 240a is adjacent to the bottom surface 210a, and is parallel to the slanted surface 226 of the 2D display panel 220. In this embodiment, the second permanent 248 away from the second electromagnet 230b has a magnetic field counter to that of the first permanent magnet 270.

As shown in FIG. 3, when the 2D display panel 220 displays 2D images, the display-mode switching device 240 is entirely received in the receiving cavity 218, and the first surface 222 of 2D display panel 220 is exposed to the outside. In such case, the electromagnet 230b is activated and attracts the adjacent second permanent magnet 248 such that the display-mode switching device 240 is securely maintained in the receiving cavity 218. The first electromagnet 230a is activated and attracts the first permanent magnet 270 such that the 2D display panel 220 can be stably positioned. In that case, the second surface 224 of 2D display panel 220 is preferably and substantially coplanar with the bottom surface 210a, and the elements 260 are in a natural state, or are compressed.

Figure 4:
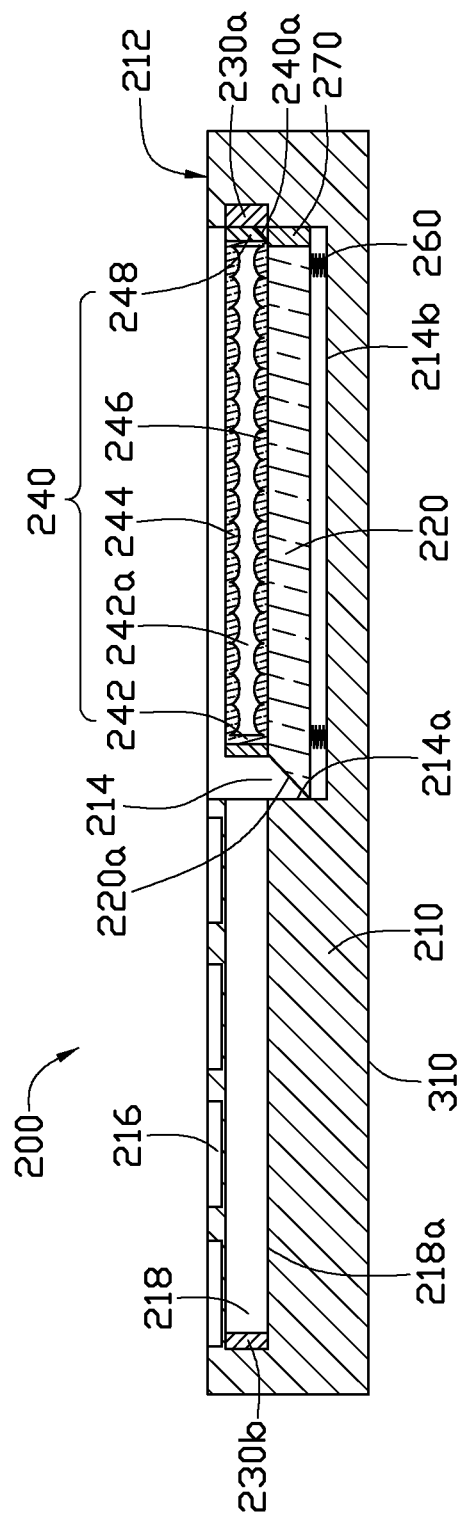
FIG. 4 is a schematic, sectional view of the electronic apparatus of FIG. 3, the display-mode switching device being in a second position.

Referring to FIG. 4, when the 2D display panel 220 displays images comprising left and right parallax images, the display-mode switching device 240 is moved out of the receiving cavity 218 to a position on the first surface 222 of the 2D display panel 220. In such case, the first electromagnet 230a is activated and attracts the second permanent magnet 248 away from the second electromagnet 230b such that the display-mode switching device 240 can be securely laid over the 2D display panel 220. The 2D display panel 220 is then pressed by the display-mode switching device 240 into a lower position. A principal of displaying 3D images in this embodiment is identical to the first exemplary embodiment.

A movement process of the display-mode switching device 240 from a first position as shown in FIG. 3 to a second position as shown in FIG. 4 is described as follows. The second electromagnet 230b is reversely excited to repel the adjacent second permanent magnet 248, and the first electromagnet 230a is reversely excited to repel the first permanent magnet 270 and attract the second permanent magnet 248 away from the second electromagnet 230b. The display-mode switching device 240 begins to move toward the first electromagnet 230a by virtue of the repellence of the second electromagnet 230b and the attraction of the first electromagnet 230a. Because of the slanted surface 226 of the 2D display panel 220 and the slanted surface 240a of the second permanent magnet 248, the display-mode switching device 240 is easily moved onto the first surface 222 of the 2D display panel 220 and finally contacts the first electromagnetic 230a.

In the embodiments, the electronic apparatuses 100 and 200 can switch from 2D to 3D display-mode by moving the display-mode switching devices 140 and 240, respectively. Therefore, the electronic apparatuses 100 and 200 can clearly display both 2D and 3D images interchangeably.

It is to be understood that the above-described embodiments are intended to illustrate rather than limit the disclosure. Variations may be made to the embodiments without departing from the spirit of the disclosure. The above-described embodiments illustrate the scope of the disclosure but do not restrict the scope of the disclosure.

The invention claimed is:

1. An electronic apparatus comprising:
a main body comprising a first surface, the main body defining a receiving recess and a receiving cavity in the first surface, the receiving recess being in communication with the receiving cavity;
a 2-dimensional display panel received in the receiving recess for selectively displaying 2-dimensional images, and left and right parallax images;
a keypad mounted on the first surface, the receiving cavity positioned beneath the keypad; and
a display-mode switching device comprising at least one lenticular lens sheet capable of directing the left parallax image light beams to a left eye of the viewer and directing the right parallax image light beams to a right eye of the viewer, the display-mode switching device being slidable between a first position where the at least one lenticular lens sheet covers the 2-dimensional display panel to convert the left and right parallax images into stereoscopic images and a second position where the at least one lenticular lens sheet is received in the receiving cavity and the 2-dimensional display panel is exposed to an outside of the main body such that the 2-dimensional images displayed by the 2-dimensional display panel are directly viewable by the eyes of the viewer without viewing through the at least one lenticular lens sheet.

2. The electronic apparatus of claim 1, further comprising a plurality of spring elements, the main body comprising a first bottom surface in the receiving recess parallel to the first surface, the spring elements being configured for applying a force to the 2-dimensional display panel to move the 2-dimensional display panel from the second position to the first position thereof.

3. The electronic apparatus of claim 2, wherein the main body comprises a second bottom surface in the receiving cavity parallel to the first bottom surface, and a distance between the first and second bottom surfaces is larger than a thickness of the 2-dimensional display panel.

4. The electronic apparatus of claim 2, wherein the spring elements are in a natural state when the 2-dimensional display panel is in the second position thereof.

5. The electronic apparatus of claim 4, wherein the spring elements are in a compressed state when the 2-dimensional display panel is in the first position thereof.

6. The electronic apparatus of claim 4, wherein the 2-dimensional display panel further comprises a first slanted surface adjacent to an opening of the receiving cavity.

7. The electronic apparatus of claim 6, further comprising a first electromagnet, a second electromagnet, a first permanent magnet, a second permanent magnet, and a third permanent magnet, the first electromagnet being arranged in the receiving recess, the first permanent magnet being fixed on a side face of the 2-dimensional display panel, the second electromagnet being arranged in the receiving cavity opposite to the first electromagnet, the second permanent magnet being fixed on a side face of the display-mode switching device facing toward the second electromagnet, the third permanent magnet being fixed on another side face of the display-mode switching device facing the first electromagnet.

8. The electronic apparatus of claim 7, wherein the third permanent magnet comprises a second slanted surface adjacent to the second bottom surface, the second slanted surface being parallel to the first slanted surface.

9. The electronic apparatus of claim 8, wherein the at least one lenticular lens sheet comprises two spaced lenticular lens sheets facing toward and parallel to each other, each of the lenticular lens sheets comprising a plurality of cylindrical lenses, the cylindrical lenses of one of the lenticular sheets aligned with the respective cylindrical lens of the other lenticular sheet.

10. The electronic apparatus of claim 1, wherein the main body includes a first side face, a bottom face, and a second side face in the receiving recess, the bottom face being parallel to the first surface, the first side face and a second side face being opposite to each other, and being adjacent to the first surface, the first side face being adjacent to the keypad, the receiving cavity being defined in the first side face and extending away from the receiving recess, the display-mode switching device being slidable between the first position and the second position through the first side face.

11. The electronic apparatus of claim 10, further comprising a plurality of spring elements, the spring elements arranged between the bottom face and the 2-dimensional display panel, the spring elements configured for applying a force to the 2-dimensional display panel to move the 2-dimensional display panel from the second position to the first position thereof.

12. The electronic apparatus of claim 11, wherein the main body comprises a second bottom face in the receiving cavity parallel to the first bottom face, and a distance between the first and second bottom face is larger than a thickness of the 2-dimensional display panel.

13. The electronic apparatus of claim 12, wherein the spring elements are in a natural state when the 2-dimensional display panel is in the second position, and in a compressed state when the 2-dimensional display panel is in the first position.

14. The electronic apparatus of claim 13, wherein the 2-dimensional display panel further comprises a first slanted surface adjacent to the first side face, the first slanted surface extending downward to the first side face from a surface of the 2-dimensional display panel facing away from the spring elements.

15. The electronic apparatus of claim 14, further comprising a first electromagnet, a second electromagnet, a first permanent magnet, a second permanent magnet, and a third permanent magnet, the first electromagnet being arranged on the second side face in the receiving recess, the first permanent magnet being fixed on a side face of the 2-dimensional display panel opposite to the second side face, the second electromagnet being arranged on a side of the receiving cavity opposite to the first electromagnet, the second permanent magnet being fixed on a side face of the display-mode switching device facing toward the second electromagnet, the third permanent magnet being fixed on another side face of the display-mode switching device facing away from the second permanent magnet.

16. The electronic apparatus of claim 15, wherein the third permanent magnet comprises a second slanted surface adjacent to the second bottom face, the second slanted surface being parallel to the first slanted surface.

17. The electronic apparatus of claim 1, wherein the at least one lenticular lens sheet comprises two spaced lenticular lens sheets facing toward and parallel to each other, each of the lenticular lens sheets comprising a plurality of cylindrical lenses, the cylindrical lenses of one of the lenticular sheets aligned with the respective cylindrical lens of the other lenticular sheet.

18. An electronic apparatus comprising:

a main body comprising a first surface, the main body defining a receiving recess and a receiving cavity in the first surface, the receiving recess in communication with the receiving cavity;

a 2-dimensional display panel received in the receiving recess for selectively displaying 2-dimensional images, and left and right parallax images;

a keypad mounted on the first surface, the receiving cavity positioned beneath the keypad;

a display-mode switching device comprising at least one lenticular lens sheet capable of directing the left parallax image light beams to a left eye of the viewer and directing the right parallax image light beams to a right eye of the viewer, the display-mode switching device slidable between a first position where the at least one lenticular lens sheet covers the 2-dimensional display panel to convert the left and right parallax images into stereoscopic images and a second position where the at least one lenticular lens sheet is received in the receiving cavity and the 2-dimensional display panel is exposed to an outside of the main body such that the 2-dimensional images displayed by the 2-dimensional display panel are directly viewable by the eyes of the viewer without viewing through the at least one lenticular lens sheet; and a first electromagnet, a second electromagnet, a first permanent magnet, a second permanent magnet, and a third permanent magnet, the first electromagnet arranged in the receiving recess, the first permanent magnet being fixed on a side face of the 2-dimensional display panel, the second electromagnet being arranged in the receiving cavity opposite to the first electromagnet, the second permanent magnet being fixed on a side face of the display-mode switching device facing toward the second electromagnet, the third permanent magnet fixed on another side face of the display-mode switching device facing toward the first electromagnet.

19. The electronic apparatus of claim 18, further comprising a plurality of spring elements, the main body comprising a first bottom surface in the receiving recess parallel to the first surface, the spring elements being configured for applying a force to the 2-dimensional display panel to move the 2-dimensional display panel from the first position to the second position.

20. The electronic apparatus of claim 19, wherein the main body comprises a second bottom surface in the receiving cavity parallel to the first bottom surface, and a distance between the first and second bottom surfaces is larger than a thickness of the 2-dimensional display panel.

* * * * *